United States Patent [19]

Seto

[11] Patent Number: 4,601,058
[45] Date of Patent: Jul. 15, 1986

[54] IMAGE READER FOR FACSIMILE APPARATUS OR THE LIKE

[75] Inventor: Toshio Seto, Zama, Japan

[73] Assignee: Ricoh Company, Ltd., Tokyo, Japan

[21] Appl. No.: 742,094

[22] Filed: Jun. 6, 1985

[30] Foreign Application Priority Data

Jun. 12, 1984 [JP] Japan .............................. 59-119064

[51] Int. Cl.⁴ .............................................. G06K 9/38
[52] U.S. Cl. ........................................ 382/52; 382/53; 358/282
[58] Field of Search ............................ 382/52, 53, 54; 358/282

[56] References Cited

U.S. PATENT DOCUMENTS 3,927,309 12/1975 Fujiwara et al. ..................... 382/54
4,298,895 11/1981 Arai et al. ............................ 382/54

Primary Examiner—Leo H. Boudreau
Assistant Examiner—Jacqueline Todd
Attorney, Agent, or Firm—Oblon, Fisher, Spivak, McClelland & Maier

[57] ABSTRACT

An image reading device for a facsimile apparatus or the like compensates outputs of a line image sensor by shading while reading out a document. When a reference signal representative of a particular pixel is derived from a contaminated portion of a reference or white image, a reference signal representative of a pixel which immediately precedes that particular pixel is substituted for the latter. This promotes accurate shading which is free from the influence of contamination.

4 Claims, 11 Drawing Figures

IMAGE READER FOR FACSIMILE APPARATUS OR THE LIKE

BACKGROUND OF THE INVENTION

The present invention relates to an image reading device for a facsimile apparatus or the like.

In an image reading device, or image reader, installed in a facsimile apparatus and others to serve as image inputting means, images in a document which are alinged with a predetermined readout line are focused to a line image sensor which implements main scanning, while the document is fed in a subscan direction by a document feed mechanism. Generally, the level of light incident to the line image sensor is not even along the length of the sensor and is lowered at opposite end portions of the sensor due to the characteristic intensity distribution of a light source, focusing characteristics of optics, and other factors. In light of this, a wave shaping circuit is used to shade outputs of the line image sensor for compensation. Specifically, outputs of the line image sensor generated by reading a reference or white image is stored in a line memory pixel by pixel as reference signals and, during readout of an actual document, outputs of the sensor are shaded referencing the stored pixel-by-pixel reference signals.

The problem with the above-described prior art wave shaping circuit, or wave shaper, is that contamination such as dust deposited on the reference image is reflected by a decrease in the level of an analog video signal representative of a particular pixel which is aligned with the contamination, i.e. output level of the line image sensor. Should signals effected by such contamination be falsely stored in the line memory as reference signals, images read out by referencing the reference signals would involve white lines and black lines.

SUMMARY OF THE INVENTION

It is therefore an object of the present invention to provide an image reader for a facsimile apparatus or the like which is free from the influence of contamination in a reference or white image.

It is another object of the present invention to provide a generally improved image reader for a facsimile apparatus or the like.

An image reading device of the present invention is of the type storing output signals of a line image sensor, which are provided by reading a reference white image, in a line memory pixel by pixel as reference signals and, then, compensating by shading outputs of the line image sensor which are provided by reading a document referencing the reference signals. The image reading device comprises a computing circuit for computing a variation between an output of the line image sensor representative of a particular pixel and an output of the line image sensor representative of a pixel which immediately precedes the particular pixel, and generating an output indicative of a result of the computation, and a decision circuit for determining that the variation computed by the computing circuit has exceeded a predetermined variation ratio responsive to the output of the computing circuit to generate a decision output signal. The line memory is constructed to, while the reference white image is read, store a reference signal representative of a pixel immediately preceding a pixel for which the decision circuit has generated the decision output signal, as a reference signal representative of the pixel for which the decision circuit has generated the decision output signal.

In accordance with the present invention, an image reading device for a facsimile apparatus or the like compensates outputs of a line image sensor by shading while reading out a document. When a reference signal representative of a particular pixel is derived from a contaminated portion of a reference or white image, a reference signal representative of a pixel which immediately precedes the particular pixel is substituted for the latter. This promotes accurate shading without being effected by the contamination.

The above and other objects, features and advantages of the present invention will become more apparent from the following detailed description taken with the accompanying drawings.

DESCRIPTION OF THE PREFERRED EMBODIMENT

While the image reader for a facsimile apparatus or the like of the present invention is susceptible to numerous physical embodiments, depending upon the environment and requirements of use, a substantial number of the herein shown and described embodiment have been made, tested and used, and all have performed in an eminently satisfactory manner.

Before entering into detailed description of the present invention, a brief reference will be made to a prior art image reader as well as a wave shaping circuit associated therewith.

Figure 1:
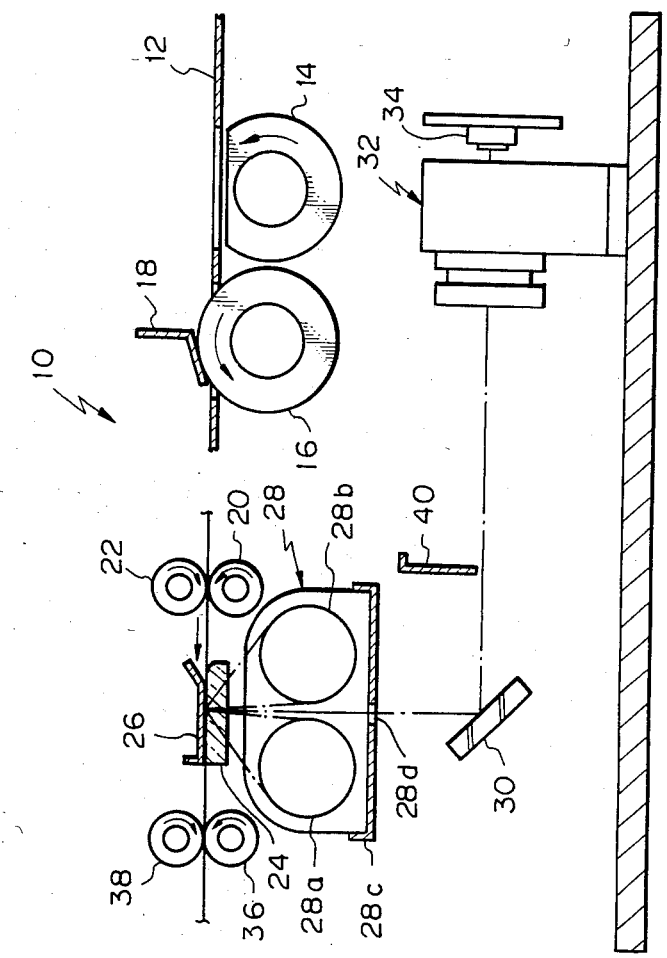
FIG. 1 is a view of a prior art image reader.

Referring to FIG. 1, a prior art image reader is shown and generally designated by the reference numeral 10. Documents (not shown) laid on a document table 12 are fed by a feed roller 14 to a separator roller 16 and, by the cooperation of the roller 16 with a separator plate 18, advanced one by one toward a readout station. In the readout station, the document is driven by a drive roller 20 and a driven roller 22 to the space between a glass platen 24 and a presser plate 26 to be illuminated by a light source unit 28. As shown, the light source unit 28 comprises fluorescent lamps 28a and 28b and a bracket 28c supporting the lamps 28a and 28b. Images aligned with a predetermined readout line on the glass platen 24 are optically guided by a slot 28d provided in the bracket 28c onto a mirror 30 and then reflected by the mirror 30 to be focused onto a line image sensor 34, which is included in a lens unit 32. Thereafter, the document is fed out of the readout station by a drive roller 36 and a driven roller 38.

Figure 2:
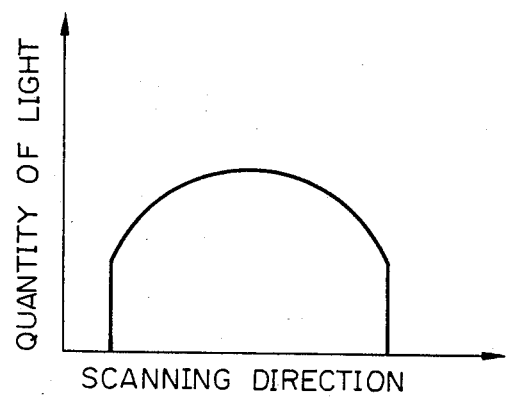
FIG. 2 is a plot representative of a distribution of quantities of light which is incident to a line image sensor installed in the image reader of FIG. 1.
Figure 3:
FIG. 3 is a front view of a shading plate which is applicable to the image reader of FIG. 1.
Figure 4:
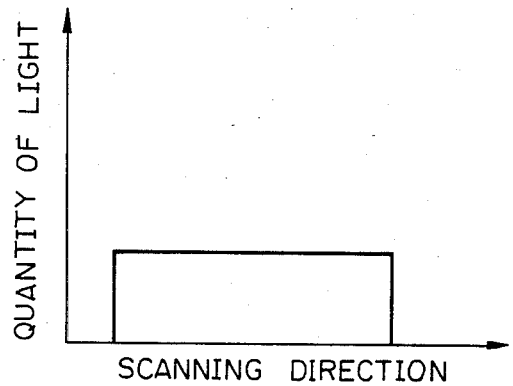
FIG. 4 is a plot showing a compensated distribution of quantities of light which are incident to the line image sensor.

As well known in the art, due to a characteristic intensity distribution of the fluorescent lamps 28a and 28b as well as to the focusing characteristics of the lens unit 32, the light incident to the line image sensor 34 shows an uneven level distribution as represented by a curve in FIG. 2, that is, the level is lower at opposite end portions of the line image center 34 than at the intermediate portion. An expedient heretofore employed to settle such a situation comprises a shading plate 40 having such a configuration as shown in FIG. 3 and disposed in an optical path in such a manner as to reduce the quantity of light incident to the intermediate portion of the line image sensor 34. Such compensation implemented by shading sets up a substantially even incident light level distribution, yet with an accuracy of about ±10%, as shown in FIG. 4.

To back up or entirely replace the shading plate 40 whose accuracy is unsatisfactory as mentioned, there has been extensively used a wave shaping circuit which stores outputs of the line image sensor 34 provided by reading a reference or white image pixel by pixel as reference signals and, while a document is actually read, shades the outputs of the line image sensor 34 referencing the stored reference signals.

Figure 5:
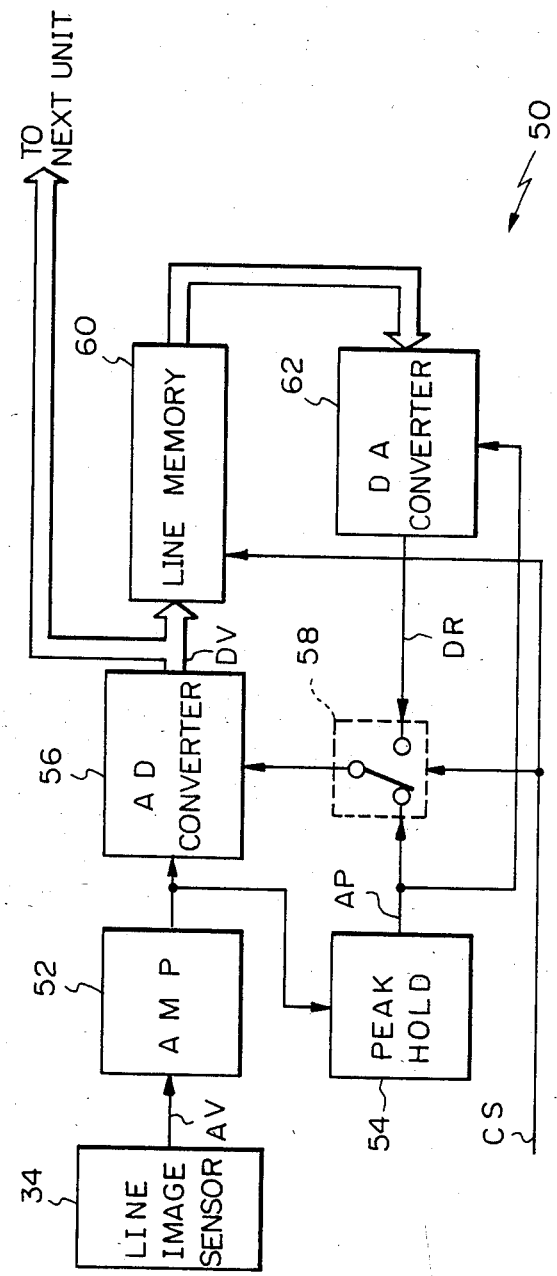
FIG. 5 is a block diagram of a prior art wave shaping circuit.

Referring to FIG. 5, a prior art wave shaping circuit of the kind stated above is shown. An analog video signal AV generated by the line image sensor 34 is applied via an amplifier 52 to a peak hold circuit 54 and an analog-to-digital (AD) converter 56. When the image reader is to read a reference or white image, a control signal CS from a controller (not shown) is turned from low level to high level to actuate a switch 58 to the illustrated position. In this condition, a peak signal AP output from the peak hold circuit 54 is applied to a reference input terminal of the AD converter 56 via the switch 58 and, at the same time, a line memory 60 capable of storing one complete line of reference signals is conditioned for a readout mode. As a result, the analog video signals AV output from the line image sensor 34 are converted by the AD converter 56 pixel by pixel to digital video signals DV referencing their peaks. The digital video signals DV are stored in the line memory 60 as pixel-by-pixel reference signals.

When the image reader is to read an actual document, the control signal CS is made low level. Then, the switch 58 is controlled to select an output of a digital-to-analog (DA) converter 62, while the line memory 60 is conditioned for a read mode. In this condition, the reference signals stored in the line memory 60 are read out pixel by pixel to be applied to the DA converter 62 which then provides analog signals DR. The analog signals DR are routed via the switch 58 to the reference input terminal of the AD converter 56, with the result that the digital video signals DV are standardized based on the condition associated with the reference image, then shaped, and then delivered to the following unit such as a binarizer or a dither matrix circuit.

Figure 6:
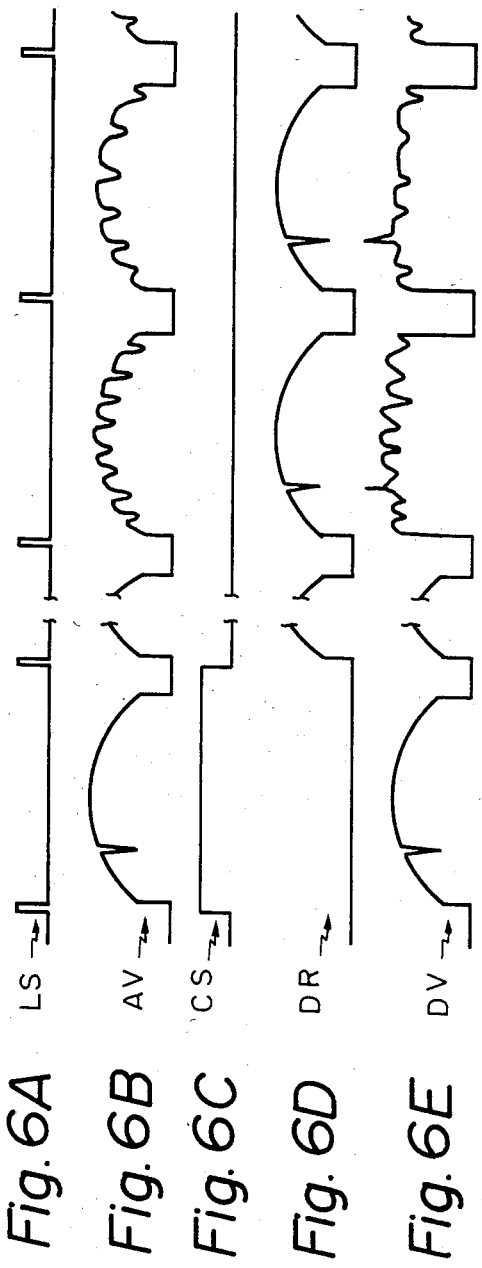
FIGS. 6A-6E show waveforms representative of the operation of the circuit shown in FIG. 5.

As briefly discussed earlier, however, such a wave shaper suffers from the following drawback. Where dust or like contamination has deposited on the reference image such as implemented by a surface of the presser plate 26, analog video signals AV representative of those pixels which cover the contamination are lowered in level as shown in FIG. 6B, in turn lowering the level of their associated digital video signals DV as shown in FIG. 6E. Signals so effected by contamination are stored in the line memory 62. As a result, during document readout, analog signals DR such as shown in FIG. 6D are applied to the AD converter 56 so that the digital video signals DV representative of the pixels which are associated with the contamination in the white image are influenced by the contamination. The result is the appearance of white stripes and/or black stripes in reproduced images. The line image sensor 34 starts its operation timed to each line sync signal LS as shown in FIG. 6A. The control signal CS is shown in FIG. 6C.

Figure 7:
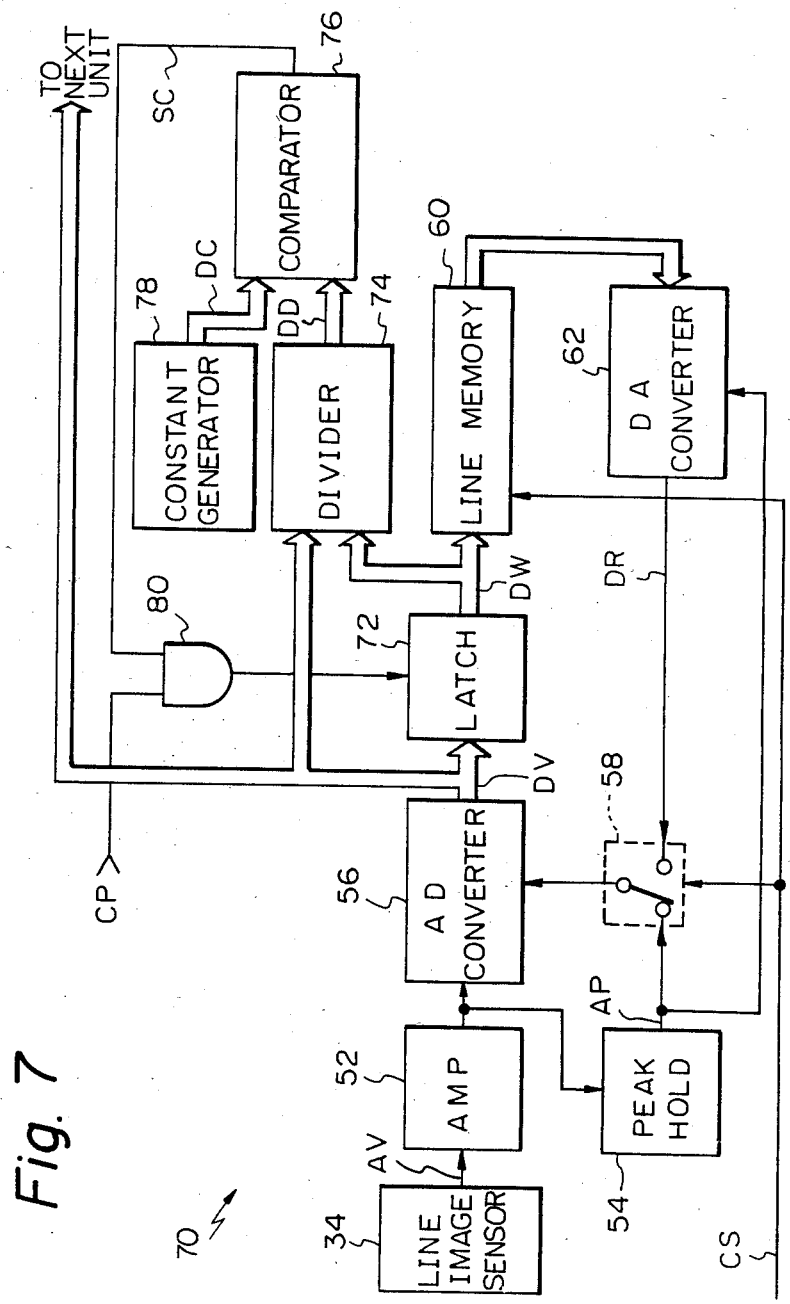
FIG. 7 is a block diagram of a wave shaping circuit in accordance with a preferred embodiment of the present inention.

Referring to FIG. 7, a wave shaping circuit in accordance with the present invention which is free from the above-described drawback is shown and generally designated by the reference numeral 70. In FIG. 7, the same or similar structural elements as those shown in FIG. 5 are designated by like reference numerals.

In FIG. 7, the wave shaper 70 includes a latch circuit 72 to which digital video signals DV from an AD converter 56 are applied. The latch circuit 72 is adapted to delay each of the input signals DV by one pixel. The signals DV and outputs DW of the latch 72 are applied to a divider 74. The divider 74 divides each digital video signal DV by its associated latch output DW, that is, divides a digital video signal DV representative of a currently read pixel by a digital video signal DV, or signal DW, representative of the immediately preceding pixel. The output DD of the divider 74 is fed to one input terminal of a comparator 76, while a reference signal which is predetermined data DC provided by a constant generator 78 is applied to the other input terminal of the comparator 76. When the data DD has become smaller than the reference data DC, the comparator 76 makes its output SC low level to thereby disenable an AND gate 80. The AND gate 80 then prevents clock pulses CP which are timed to pixels of the analog video signals AV from being applied to the latch 72, so that the latch 72 holds data (signal DW) then being latched in place of a digital video signal DV representative of the currently read pixel.

If the reference or white image has any contamination therein, a particular analog signal AV which is associated with the contamination is sharply reduced in level compared to the immediately preceding analog signal AV. In this condition, the output data DD of the divider 74 becomes smaller than the reference data DC so that the output SC of the comparator 76 is made low level so as to cause the AND gate 80 to block the clock pulses CP. Consequently, the digital video signal DV immediately preceding the one which is associated with the contamination is stored as a reference signal in the line memory 60 in place of the latter.

The rest of the construction is identical with that of FIG. 5 and, therefore, detailed description thereof will be omitted.

As described above, the wave shaper 70 in accordance with the present invention replaces a reference signal representative of a pixel which is associated with contamination on a white image with a reference signal representative of the immediately preceding pixel which is free from contamination. The contamination, therefore, is prevented from showing itself in reproduced images in one way or another.

In summary, it will be seen that the present invention provides an image reader for a facsimile apparatus of the like which effects shading with desirable accuracy to eliminate the influence of contamination which may occur in a reference or white image.

Various modifications will become possible for those skilled in the art after receiving the teachings of the present disclosure without departing from the scope thereof. For example, while in the illustrative embodiment the data read out of the line memory 60 are converted to analog signals, they may be directly applied to a variable gain amplifier for signal level control. Since the the illustrative embodiment eliminates the need for synchronization between storage of reference signals and readout of actual images and, thereby, the need for high-speed operation, the latch 72, divider 74, comparator 76, constant generator 78 and AND gate 80 may be implemeted by a microcomputer. The data DC generated by the contant generator 78 may be selected from a range of 20-50% and may even be designed variable from the selected value. Further, pixel-to-pixel signal level changes may be decided in terms of differences, instead of quotients.

What is claimed is:

1. An image reading device for storing output signals of a line image sensor, comprising:
    a line memory for storing as reference signals, the output signals pixel by pixel of said line image sensor while reading a reference white image and using said stored reference signals to shade the output of said line image sensor while reading a document;
    latch means for temporarily storing an output of the line image sensor of a pixel;
    computing means for computing a variation between an output of the line image sensor representative of a particular pixel and an output of the line image sensor representative of a pixel which immediately precedes said particular pixel stored in said latch means, and generating an output indicative of a result of the computation;
    constant generator means for producing a signal indicative of a predetermined variation ratio; and
    decision means for determining that the variation computed by said computing means has exceeded said predetermined variation ratio, said decision means being responsive to the output of the computing means and said constant generator signal to generate a decision output signal;
    logic means connected to said decision means and said latch means for receiving said decision output signal and producing a latch control signal in response thereto for controlling the storage of a pixel signal in said latch means;
    said line memory receiving and storing a pixel signal from said latch means, said pixel signal being the reference signal of the particular pixel when said control signal is in a first state and said pixel signal being the reference signal of the pixel immediately preceeding said particular pixel in place of the reference signal for said particular pixel when the control signal is in a second state.

2. An image reading device as claimed in claim 1, wherein the computing means comprises a divider for generating a division output signal by dividing the output of the line image sensor associated with the particular pixel by the output of the line image sensor associated with the pixel immediately preceding the particular pixel.

3. An image reading device as claimed in claim 2, wherein the decision means comprises a comparator for comparing the division output signal of said divider with said constant generator signal.

4. An image reading device for storing reference output signals representing a reference white image in order to compensate outputs of the line image sensor representing document images, comprising:
    a line image sensor for producing electrical signals in response to a scanned line;
    a peak hold circuit connected to the output of said line image sensor for storing the peak signal from said line image sensor;
    an analog-to-digital converter connected to the output of said line image sensor for converting said electrical signal into a digital signal;
    latch means connected to the output of said analog-to-digital converter for storing temporarily a signal from said analog-to-digital converter representative of an output signal from said line image sensor for one pixel;
    a line memory connected to the output of said latch means for storing a plurality of signals representing the output signals and the line image sensor for an entire line of pixels;
    a digital-to-analog converter connected to the output of said line memory for converting the digital signals from said line memory to analog signals;
    switching means connected to said peak hold circuit and said digital-to-analog converter and producing an output connected to said analog-to-digital converter, wherein the output from said peak hold circuit is applied to said analog-to-digital converter in a first condition and the output from said digital-to-analog converter is connected to said analog-to-digital converter in the second condition, where the first condition occurs when the image reading device is reading a reference white image and the second condition occurs when the image reading device is reading a document line;
    computing means having a first input connected to the output of said analog-to-digital converter, and a second input connected to the output of said latch means for computing a variation between said first input representing a particular pixel and said second input representing a pixel which immediately precedes said particular pixel, said computing means producing an output indicative of the variation;
    constant generator means for producing a signal indicative of a predetermined variation;
    comparator means connected to the output of said constant generator means and the output of said computing means for determining when said variation exceeds said predetermined variation and producing a decision output signal in response thereto;
    said decision output signal being connected to said latch means so that the signal representing the pixel immediately preceding said particular pixel is stored in place of the signal representing the particular pixel in said line memory.

* * * * *